United States Patent
Nishita

(10) Patent No.: US 7,927,885 B2
(45) Date of Patent: Apr. 19, 2011

(54) HAZARDOUS SUBSTANCE REMOVING MATERIAL, METHOD FOR REMOVING HAZARDOUS SUBSTANCES, AND NONWOVEN FABRIC

(75) Inventor: Nobuhiro Nishita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 577 days.

(21) Appl. No.: 11/964,831

(22) Filed: Dec. 27, 2007

(65) Prior Publication Data
US 2008/0156743 A1 Jul. 3, 2008

(30) Foreign Application Priority Data

Dec. 27, 2006 (JP) ................................. 2006-351489

(51) Int. Cl.
*G01N 33/543* (2006.01)
(52) U.S. Cl. ..................................................... 436/518
(58) Field of Classification Search .................. None
See application file for complete search history.

(56) References Cited

U.S. PATENT DOCUMENTS

| | | | | |
|---|---|---|---|---|
| 4,321,057 A | * | 3/1982 | Buckles | 435/7.1 |
| 5,486,410 A | * | 1/1996 | Groeger et al. | 442/353 |
| 7,037,642 B2 | * | 5/2006 | Hei | 435/2 |
| 7,470,548 B2 | * | 12/2008 | Ozawa et al. | 436/518 |

FOREIGN PATENT DOCUMENTS

| | | |
|---|---|---|
| JP | 04-335836 A | 11/1992 |
| JP | 2002-061040 A | 2/2002 |
| JP | 2004-313755 A | 11/2004 |

OTHER PUBLICATIONS

Office Action dated Jan. 5, 2011 in Japanese Application No. JP 2006-351489.

* cited by examiner

*Primary Examiner* — Ann Y Lam
(74) *Attorney, Agent, or Firm* — Sughrue Mion, PLLC

(57) ABSTRACT

An objective to be solved by the present invention is to provide a hazardous substance removing material capable of efficiently capturing and quickly inactivating hazardous substances of microbe origin such as viruses and bacteria, so as to minimize influences on the human body. The present invention provides a hazardous substance removing material which comprises a support having antibodies supported thereon, wherein the support is made of a fiber, and the moisture regain of the core fiber of the support is different from the moisture regain of the sheath fiber of the support.

7 Claims, 2 Drawing Sheets

HAZARDOUS SUBSTANCE REMOVING MATERIAL, METHOD FOR REMOVING HAZARDOUS SUBSTANCES, AND NONWOVEN FABRIC

TECHNICAL FIELD

The present invention relates to a hazardous substance removing material comprising a fiber provided with antibodies, a method for removing hazardous substances using the same, and a nonwoven fabric thereof.

BACKGROUND ART

As methods for removing airborne hazardous substances of microbe origin such as viruses and bacteria, there are methods of filtration using various kinds of filters, physical adsorption using adsorbents, and the like.

The removal efficiency of airborne hazardous substances by means of a filter is greatly affected by the diameter and the density of a fiber used for the filter, the filter thickness, and the like. Typically, the removal efficiency increases as the fiber diameter of the filter becomes finer, the fiber density increases, or the filter thickness increases.

In order to improve the filtration precision and the filtration life of filters, there is proposed a filter comprising a superfine fiber assembly layer consisting of a fiber having an average fiber diameter of 0.01 μm or more but less than 0.5 μm, and a fine fiber assembly layer consisting of a fiber having an average fiber diameter of 0.5 μm or more but 5 μm or less (for example, JP Patent Publication (Kokai) No. 2005-218909). The use of such a fine fiber improves the filtration precision. However, if hazardous substances to be removed are bacteria or viruses, there is a likelihood in which the bacteria that have once captured by the filter are detached therefrom and reactivated to influence the human body.

In order to capture and inactivate bacteria or viruses by a filter, it is proposed to form a filter by using a fiber which has antibodies supported thereon with an official moisture regain of 7% or more (for example, JP Patent No. 3642340). Captured bacteria and the like are inactivated by the antigen-antibody reaction, by which the captured bacteria and the like can be kept from influencing the human body even if they are detached from the filter.

However, in order to maintain the activity of antibodies, the humidity environment in the vicinity of the fiber has to be indispensably controlled, and a high hygroscopic material such as a cellulosic fiber has to be contained therein. If the content of the cellulosic fiber is high, the strength of the fiber itself can not be kept, causing a need of enlarging the fiber diameter, which results in lowering of the removal efficiency.

From the above situation, there has been a demand for the development of fiber materials for filters which sufficiently satisfy required performances such as the high removal efficiency and mechanical properties, and enable to capture and inactivate bacteria, viruses, and the like.

DISCLOSURE OF THE INVENTION

The present invention has been done for solving the problems of conventional hazardous substance removing materials. That is to say, an objective to be solved by the present invention is to provide a hazardous substance removing material capable of efficiently capturing and quickly inactivating hazardous substances of microbe origin such as viruses and bacteria, so as to minimize influences on the human body.

Moreover, another objective to be solved by the present invention is to provide an efficient method for removing hazardous substances using the hazardous substance removing material.

In order to solve the above problems, the inventors of the present invention have conducted intensive studies. As a result, they have found that a hazardous substance removing material capable of efficiently capturing and quickly inactivating hazardous substances, so as to minimize influences on the human body can be provided by having antibodies supported on a support wherein the moisture regain of the core fiber is different from the moisture regain of the sheath fiber. This has led to the completion of the present invention.

That is to say, according to the present invention, there is provided a hazardous substance removing material which comprises a support having antibodies supported thereon, wherein the support is made of a fiber, and the moisture regain of the core fiber of the support is different from the moisture regain of the sheath fiber of the support.

Preferably, the hygroscopicity of the sheath fiber of the support is higher than the hygroscopicity of the core fiber of the support.

Preferably, the weight ratio of the core fiber of the support to the sheath fiber of the support is 45:55 to 85:15.

Preferably, the official moisture regain of the fiber constituting the support is less than 7%.

Preferably, the fiber diameter of the fiber constituting the support is 100 nm or less.

Preferably, the tensile elastic modulus of the fiber constituting the support is 1 GPa or more.

Preferably, the fiber constituting the support is produced by an electrospinning method.

According to another aspect of the present invention, there is provided a method for removing hazardous substances which comprises a step of removing hazardous substances in a gas phase or a liquid phase by using the hazardous substance removing material of the present invention mentioned above.

According to another aspect of the present invention, there is provided a nonwoven fabric which comprises the hazardous substance removing material of the present invention mentioned above.

According to the present invention, it becomes possible to produce a hazardous substance removing material capable of removing particles in a gas phase or a liquid phase with a high efficiency, in particular capable of selectively capturing and inactivating hazardous substances of microbe origin such as viruses and bacteria. Moreover, the hazardous substance removing material of the present invention is capable of maintaining the activity of antibodies on the surface of the fiber and keeping a sufficient strength of the fiber itself, by varying the moisture regain between the core and the sheath. Further, the abovementioned hazardous substance removing material has a sufficient mechanical strength and a long service life as a filter, and thus can be practically used as a filter material for air purification and liquid purification. According to the method of the present invention, an air purifier or a liquid purifier capable of efficiently removing hazardous substances in a gas phase or a liquid phase can be produced, which is thus very useful in the industry.

BEST MODE FOR CARRYING OUT THE INVENTION

Figure 1:
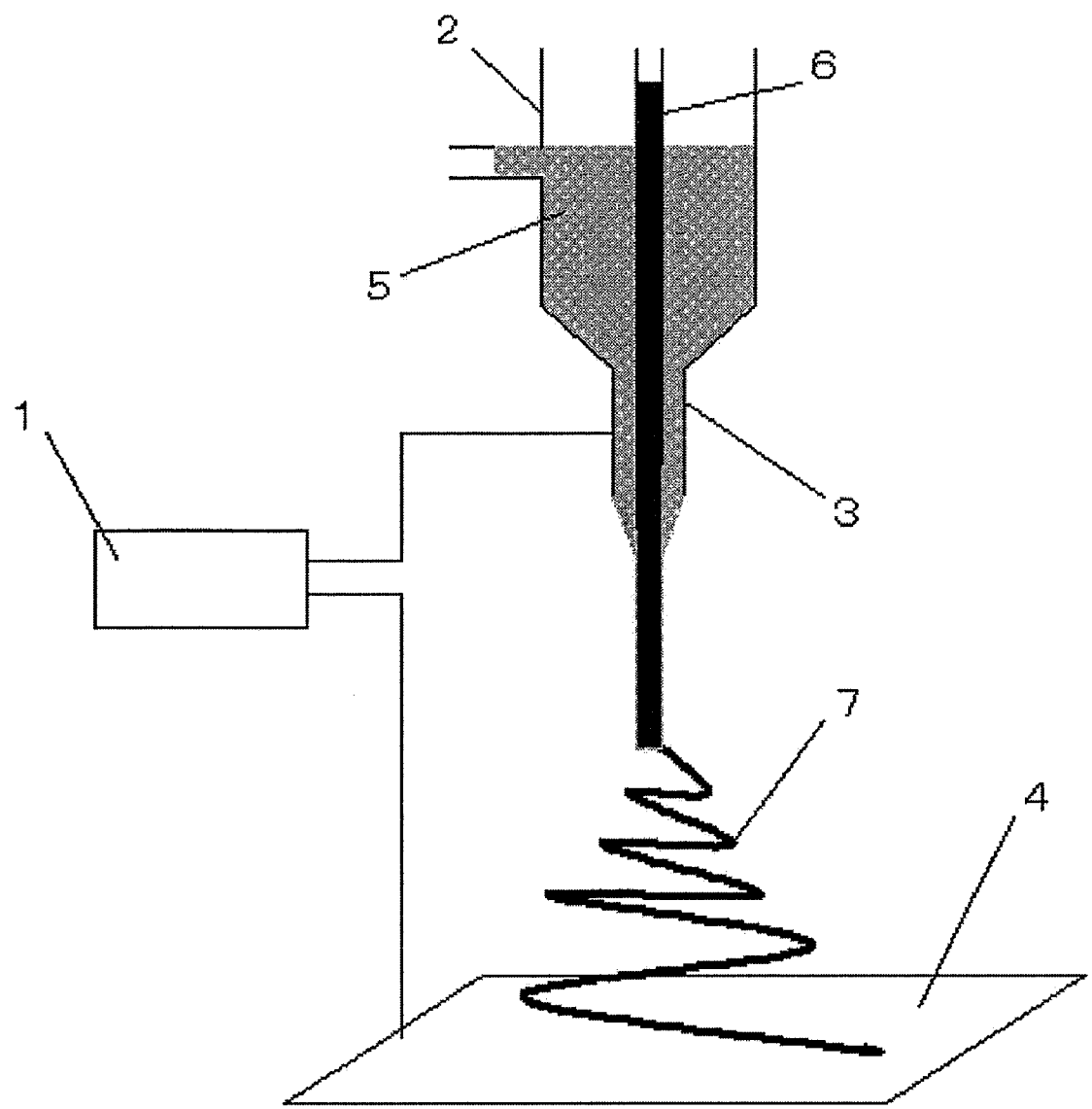
FIG. 1 illustrates an electrospinning apparatus used in examples.

The present invention is hereafter described in greater detail.

The hazardous substance removing material of the present invention comprises a support having antibodies supported thereon, wherein the support is made of a fiber, and the moisture regain of the core fiber of the support is different from the moisture regain of the sheath fiber of the support. Because moisture is essential to keep the antibody active, an antigen-antibody reaction has been employed only for purifying a liquid phase conventionally. By the above method, however, the antigen-antibody reaction can be applied to removal of the hazardous substance in a gas phase. Moreover, since the antibody captures a specific hazardous substance, selection of an antibody attains highly precise removal of a hazardous substance in which the hazardous substance is specified. Further, some antibodies themselves have a function of sterilizing and inactivating some types of hazardous substances, according to the types of hazardous substances, in which case, it is unnecessary to incorporate the techniques for sterilizing and inactivating the hazardous substance. Furthermore, the hazardous material can be removed with the single use of the hazardous substance removing material. Moreover, the structure of the support is so designed to be a double structure in which a high hygroscopic material is arranged for the sheath and a low hygroscopic material is arranged for the core, that the activity of the antibody can be maintained by controlling the humidity in the vicinity of the fiber, and simultaneously the fiber strength as a whole can be improved by arranging a highly durable synthetic fiber a lot for the core.

The support constituting the hazardous substance removing material of the present invention comprises a fiber having different moisture regains in the core and in the sheath. Herein, the moisture regain refers to the official moisture regain, wherein the official moisture regain means a moisture percentage of a water-containing fiber which has been left for a long period of time in an environment at 20° C. and at a relative humidity of 65%.

The difference of the moisture regain between the core and the sheath in the fiber is preferably within a range of 0.1% to 15.0%, more preferably a range of 0.2% to 14.0%, and particularly preferably a range of 0.5% to 13.0%.

The support constituting the hazardous substance removing material of the present invention is desirably a multi-component fiber having a low hygroscopic material for the core and a high hygroscopic material for the sheath. The arrangement of the high hygroscopic material for the sheath enables to adjust the atmosphere in the vicinity of the fiber to a humidity at which the antibodies can be active. Moreover, the arrangement of the low hygroscopic and relatively highly durable material for the core enables to improve the fiber strength as a whole.

The ratio of the low hygroscopic material for the core to the high hygroscopic material for the sheath is desirably low hygroscopic material:high hygroscopic material=45:55 to 85:15, by weight ratio. If the proportion of the high hygroscopic material exceeds 55%, the fiber strength can not be kept, causing damages after the formation, and increasing the likelihood of interfering with the processing of the filter material and the like. On the other hand, if the proportion of the high hygroscopic material less than 15%, the layer of the high hygroscopic material on the fiber surface becomes very thin, which makes it impossible to adjust the atmosphere in the vicinity of the fiber.

The ratio of the low hygroscopic material for the core to the high hygroscopic material for the sheath is preferably 45:55 to 85:15, more preferably 50:50 to 80:20, and particularly preferably 55:45 to 75:25, by weight ratio.

Regarding the low hygroscopic material constituting the core of the fiber used for the hazardous substance removing material of the present invention, the followings are suitably used: polyamide fibers such as nylon 6 and nylon 66, polyester fibers such as polyethylene terephthalate and polybutylene terephthalate, polyolefin fibers such as polyethylene and polypropylene, acrylic fibers, polyurethane, polycarbonate, and the like.

On the other hand, examples of the high hygroscopic material constituting the sheath of the fiber include regenerated cellulosic fibers such as cupra and rayon.

These materials may be used either singularly, or in mixtures of a plurality of materials.

Further, the official moisture regain of the fiber used for the hazardous substance removing material of the present invention is preferably less than 7%, more preferably less than 6%, and particularly preferably less than 5%.

The average fiber diameter of the fiber used for the hazardous substance removing material of the present invention is typically 1000 nm or less, preferably 100 nm or less, more preferably 90 nm or less, and particularly preferably 80 nm or less. The average fiber diameter of the present invention refers to a numerical value obtained by the arithmetic averaging procedure on the diameter of the fiber measured at arbitrary 300 points in SEM measurement image.

Regarding the mechanical properties of the synthetic resin fiber used in the present invention, the tensile elastic modulus is preferably 1 GPa or more, more preferably 5 GPa or more, and particularly preferably 10 GPa or more.

As to the method for producing the fiber used in the present invention, there are typical production methods such as wet spinning, dry spinning, and dry-wet spinning, and methods in which the fiber is made fine by a physical process (such as strong mechanical shearing using an ultrahigh pressure homogenizer), although an electrospinning method is preferably employed for producing an even fiber having an average fiber diameter of 100 nm or less.

For the electrospinning method, methods disclosed in "Kakou Gijyutsu (Processing Technology)", 2005, Vol. 40, No. 2, p. 101 and p. 167; "Polymer International", 1995, Vol. 36, pp. 195-201; "Polymer Preprints", 2000, Vol. 41(2), p. 1193; "Journal of Macromolecular Science Physics", 1997, B36, p. 169; and the like may be used.

In the electrospinning method, both melting method and solution method can be used, although the solution method is preferred for reducing the fiber diameter.

Regarding the solvent used for the electrospinning method, any solvent may be used as long as it dissolves the resin used for synthetic resin fibers. Examples thereof include: chloride-based solvents such as methylene chloride, chloroform, and dichloroethane; amide-based solvents such as dimethylformamide, dimethylacetamide, and N-methylpyrrolidone; ketone-based solvents such as acetone, ethyl methyl ketone, methyl isopropyl ketone, and cyclohexanone; ether-based solvents such as THF and diethyl ether; and alcohol-based solvents such as methanol, ethanol, and isopropanol. These solvents may be used either singularly, or in mixtures of a plurality of types thereof.

The resin solution used for the electrospinning method may be added with a salt such as lithium chloride, lithium bromide, potassium chloride, and sodium chloride.

As to the method for producing a fiber having different moisture regains in the core and the sheath, that is preferably used for the hazardous substance removing material of the present invention, two steps of electrospinning methods may be performed for the core and the sheath, or a spinning may be simultaneously performed for both the core and the sheath to produce the fiber having the above structure.

In cases where a spinning is simultaneously performed for the core and the sheath, an apparatus described in "Nano Letters", 2004, Vol. 4, p. 933, or the like may be used for the production.

The antibody used for the hazardous substance removing material of the present invention is a protein which is reactive (antigen-antibody reaction) specifically to a specific hazardous substance (antigen), has a molecule size of 7 to 8 nm, and is in a Y-shaped molecular form. A pair of branch portions of the antibody in the Y-shaped molecular form are called Fab, and a stem portion thereof is called Fc, among which the Fab portions capture the hazardous substance.

The type of the antibody corresponds to the type of the hazardous substance to be captured. Examples of the hazardous substance to be captured by the antibody include bacteria, fungi, viruses, allergens, and mycoplasmas. Specifically, the bacteria include, for example: the genus *Staphylococcus* (such as *Staphylococcus aureus* and *Staphylococcus epidermidis*), *Micrococcus, Bacillus anthracis, Bacillus cereus, Bacillus subtilis*, and *Propionibacterium acnes*, as gram-positive bacteria; and *Pseudomonas aeruginosa, Serratia marcescens, Burkholderia cepacia, Streptococcus pneumoniae, Legionella pneumophilia*, and *Mycobacterium tuberculosis*, as gram-negative bacteria. The fungi include, for example, *Aspergillus, Penicillius*, and *Cladosporium*. The viruses include influenza viruses, coronavirus (SARS virus), adenovirus, and rhinovirus. The allergens include pollens, mite allergens, and cat allergens.

Examples of methods for producing the antibody include: a method in which an antigen is administered to an animal such as a goat, a horse, a sheep, and a rabbit, and a polyclonal antibody is refined from the blood thereof; a method in which spleen cells of an animal to which an antigen is administered and cultured cancer cells are subjected to cell fusion and a monoclonal antibody is refined from a culture medium thereof or from a humor (such as ascites) of an animal in which the fussed cells are implanted; a method in which an antibody is refined from a culture medium of genetically modified bacteria, plant cells, or animal cells to which antibody producing gene is introduced; and a method in which a chicken to which an antigen is administered is allowed to lay an immune egg and a chicken antibody is refined from yolk powder obtained by sterilizing and spray-drying the yolk of the immune egg. Of all the above methods, the method for obtaining the antibody from a chicken egg enables easy mass production of the antibody, reducing the cost of the hazardous substance removing material.

The antibody used for the hazardous substance removing material of the present invention is preferably a chicken egg antibody.

It is desirable that the support constituting the hazardous substance removing material of the present invention is subjected to antibacterial treatment such as coating of an agent containing an antibacterial agent and/or antifungal treatment such as coating of an agent containing an antifungal agent. The antibody is principally a protein, and particularly, the chicken egg antibody is food, and the antibody may also accompany a protein other than the antibody. These proteins might serve as food for bacteria and fungi to proliferate. However, if the support is subjected to antibacterial and/or antifungal treatment, such multiplication of bacteria and the fungi is suppressed, so that a long-term storage becomes possible.

The antibacterial/antifungal agents include organic silicon quaternary ammonium salts, organic quaternary ammonium salts, biguanides, polyphenols, chitosan, silver-support colloidal silica, zeolite-support silvers, and the like. As to the treatment method, there are a post-treatment method in which an antibacterial/antifungal agent is immersed in or applied to the support made of a fiber, a raw thread/raw cotton improving method in which an antibacterial/antifungal agent is mixed in the step of synthesizing a fiber constituting the support, and the like.

Regarding methods for immobilizing the antibody to the support, there are: a method in which, after a support is subjected to silane treatment using γ-aminopropyl-triethoxysilane or the like, an aldehyde group is introduced on the surface of the support by glutaraldehyde or the like, to effect a covalent bond between the aldehyde group and an antibody; a method in which an untreated support is immersed into an aqueous solution of an antibody to cause ion boding, thereby immobilizing the antibody to the support; a method in which an aldehyde group is introduced to a support having a specific functional group to effect a covalent bond between the aldehyde group and an antibody; a method in which a support having a specific functional group is ion-bonded to an antibody; and a method in which a support is coated with a polymer having a specific functional group, followed by an introduction of an aldehyde group to effect a covalent bond between the aldehyde group and an antibody.

Here, the specific functional group includes an NHR group (R represents an alkyl group of any of methyl, ethyl, propyl, and butyl except H), an $NH_2$ group, a $C_6H_5NH_2$ group, a CHO group, a COOH group, and an OH group.

Moreover, there is also a method in which a functional group on the surface of the support is replaced with another functional group using BMPA (N-β-Meleimidopropionic acid) or the like, to effect a covalent bond between the resultant functional group and an antibody (an SH group is replaced with a COOH group by BMPA).

Further, there is another method in which a molecule (such as an Fc receptor and a protein A/G) which is selectively bindable to the Fc portion of the antibody is introduced on the surface of a support, to cause it to be bonded to the Fc of the antibody. In this case, the Fab for capturing a hazardous substance are arranged outwards from the support to cause increase in contact possibility of the hazardous substance to the Fab, resulting in efficient capturing of the hazardous substance.

The antibody may be supported on the support through a linker. In this case, the degree of freedom of the antibody on the support increases, so that the antibody can readily reach the hazardous substance, attaining a high removal performance. Divalent or multivalent crosslinking reagent may be used as the linker. Specifically, there are listed maleimide, NHS (N-Hydroxysuccinimidyl)ester, imide ester, EDC (1-Ethyl-3-[3-dimethylaminopropyl]carbodiimido), and PMPI (N-[p-Maleimidophenyl]isocyanate), which are selectively or non-selectively bonded to a target functional group (an SH group, an $NH_2$ group, a COOH group, and an OH group). Moreover, crosslinking agents have different crosslinking distances (spacer arm), and therefore, the distance can be selected within the range between about 0.1 nm to about 3.5 nm according to the target antibody. In view of efficient capturing of the hazardous substance, the linker is preferably bindable to the Fc of the antibody.

Regarding the method for introducing the linker, either one of the following methods may be possible: a method in which a linker is bonded to an antibody, and then the resultant linker is further bonded to the antibody; and a method in which a linker is bonded to a support, and then an antibody is bonded to the linker on the support.

The hazardous substance removing material of the present invention can be used for a filter for an air purifier, a mask, a wipe sheet, and the like.

EXAMPLES

The features of the present invention are hereafter more specifically described with reference to examples and comparative examples. Materials, their quantities consumed, proportions thereof, contents of processing, processing procedures, and the like set forth in the following examples can be appropriately modified without departing from the spirit of the present invention. Accordingly, the scope of the present invention is not to be construed as being limited to the specific examples shown below.

Example 1

A 10% (w/w) trifluoroacetic acid solution of polyethylene terephthalate and a 10% (w/w) tetrahydrofuran solution of ethyl cellulose were prepared. A nanofiber nonwoven fabric was produced using the apparatus of FIG. 1. With an arrangement where polyethylene terephthalate was for the core and ethyl cellulose was for the sheath, the electrospinning was carried out at a syringe feed rate of 0.01 to 0.1 mm/min with an applied voltage of 10 to 20 kV. The production was performed so that the ratio of the core to the sheath was polyethylene terephthalate:ethyl cellulose=60:40, by mass ratio. The resultant product was dried in vacuum at 80° C. for 8 hours to thereby obtain a nonwoven fabric N-1 having a thickness of 85 µm. The average fiber diameter was measured by SEM, which showed 85 nm.

Example 2

A nanofiber nonwoven fabric was produced in the same manner as that of example 1, except for that a 10% (w/w) tetrahydrofuran solution of polycarbonate was used instead of the trifluoroacetic acid solution of polyethylene terephthalate. The production was performed so that the ratio of the core to the sheath was polycarbonate ethyl cellulose=75:25, by mass ratio. The resultant product was dried in vacuum at 80° C. for 8 hours to thereby obtain a nonwoven fabric N-2 having a thickness of 75 µm. The average fiber diameter was measured by SEM, which showed 90 nm.

Example 3

A nanofiber nonwoven fabric was produced in the same manner as that of example 1, except for that a 5% (w/w) N-methylmorpholine-N-oxide solution of cellulose was used instead of the tetrahydrofuran solution of ethyl cellulose. The production was performed so that the ratio of the core to the sheath was polyethylene terephthalate:cellulose=80:20, by mass ratio. The resultant product was dried in vacuum at 80° C. for 8 hours to thereby obtain a nonwoven fabric N-3 having a thickness of 80 µm. The average fiber diameter was measured by SEM, which showed 80 nm.

Comparative Example 1

Figure 2:
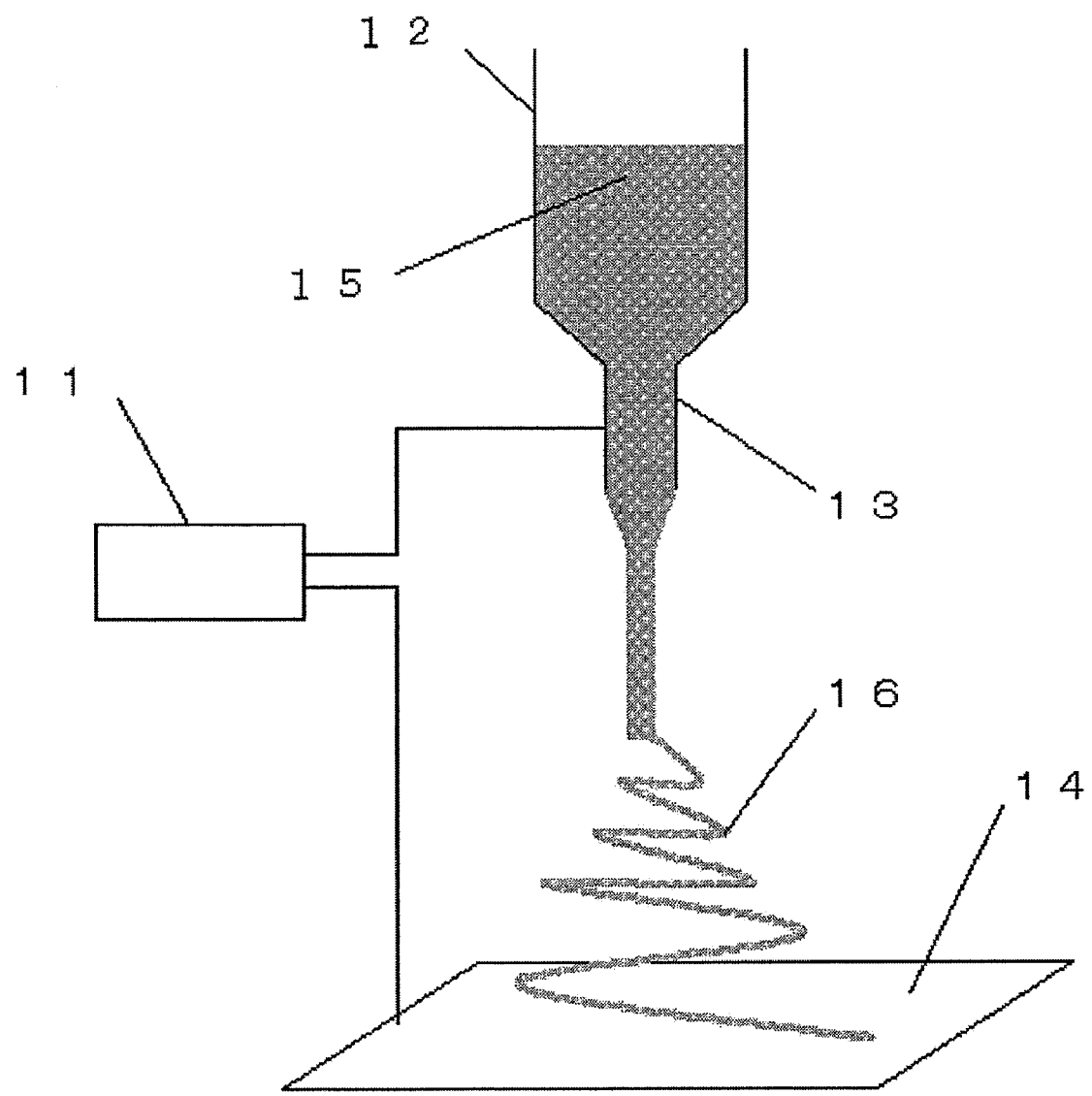
FIG. 2 illustrates an electrospinning apparatus used in comparative examples. 1 denotes Power-supply unit; 2 denotes Syringe; 3 denotes Needle; 4 denotes Collector; 5 denotes Core material solution; 6 denotes Sheath material solution; 7 denotes Nanofiber; 11 denotes Power-supply unit; 12 denotes Syringe; 13 denotes Needle; 14 denotes Collector: 15 denotes Polymer solution; and 16 denotes Nanofiber

A 10% (w/w) tetrahydrofuran solution of polycarbonate and a 10% (w/w) tetrahydrofuran solution of ethyl cellulose were prepared, which were then mixed at a ratio of 75:25 by mass ratio. A nanofiber nonwoven fabric was produced using the apparatus of FIG. 2. The electrospinning was carried out at a syringe feed rate of 0.01 to 0.1 mm/min with an applied voltage of 10 to 20 kV. The resultant product was dried in vacuum at 80° C. for 8 hours to thereby obtain a nonwoven fabric H-1 having a thickness of 75 µm. The average fiber diameter was measured by SEM, which showed 90 nm.

Comparative Example 2

A nonwoven fabric was produced using polyethylene terephthalate and ethyl cellulose in a multi-component fiber spinning method. With an arrangement where polyethylene terephthalate was for the core and ethyl cellulose was for the sheath, the production was performed so that the ratio of the core to the sheath was polyethylene terephthalate:ethyl cellulose=60:40, by mass ratio, to thereby obtain a nonwoven fabric H-2 having a thickness of 85 µm. The average fiber diameter was measured by SEM, which showed 10 µm.

Comparative Example 3

A 5% (w/w) N-methylmorpholine-N-oxide solution of cellulose was prepared. A nanofiber nonwoven fabric was produced using the apparatus of FIG. 2. The electrospinning was carried out at a syringe feed rate of 0.01 to 0.1 mm/min with an applied voltage of 10 to 20 kV. The resultant product was dried in vacuum at 80° C. for 8 hours to thereby obtain a nonwoven fabric H-3 having a thickness of 85 µm. The average fiber diameter was measured by SEM, which showed 85 nm.

Measurement of Moisture Regain

The respective samples of N-1 to N-3 and H-1 to H-3 were left for 12 hours or more in an environment at 20° C. and at a relative humidity of 65%. Then, the moisture regain of each sample was measured using a halogen moisture analyzer MB35 (manufactured by OHAUS).

Measurement of Filter Efficiency

The respective samples of N-1 to N-3 and H-1 to H-3 were punched out to have a diameter of 120 mm. Each resultant product was set in a sample holder, which was then set in a test duct having the same diameter.

Fine particles of 50 to 500 nm were generated using a particle generator (manufactured by TSI), of which fine particles having a specific diameter were introduced in the duct at a flow rate of 5.3 cm/sec, using an electrostatic classifier (manufactured by TSI).

The number of particles was counted using a condensation particle counter (manufactured by TSI) at the upstream and the downstream of the sample holder. The filter efficiency for a specific particle diameter was calculated from the ratio of the upstream particle count to the downstream particle count.

The above measurement was carried out within a range of the particle diameter of 50 to 500 nm, and the average filter efficiency was calculated.

Measurement of Tensile Elastic Modulus

Sample sections having a size of 1.0 cm×5.0 cm were cut out from the respective samples. The sections were left over night at 25° C. and at a relative humidity of 65%. Then, the tensile elastic modulus was measured at a pulling rate of 3 mm/min, using a Tensilon (Tensilon RTM-25, manufactured by Toyo Baldwin) (the distance between the chucks was 3 cm). Three samples were measured in one test, and their measured results were averaged to be employed as the tensile elastic modulus.

The above results are summarized in Table 1.

TABLE 1

Measured results of physical properties of nonwoven fabrics

| | Sample No. | | | | | |
|---|---|---|---|---|---|---|
| | N-1 | N-2 | N-3 | H-1 | H-2 | H-3 |
| Average fiber diameter | 85 nm | 90 nm | 80 nm | 90 nm | 10 μm | 85 nm |
| Moisture regain | 5.2% | 4.7% | 4.0% | 4.4% | 5.1% | 12% |
| Filter efficiency | 85% | 88% | 80% | 87% | 40% | 83% |
| Tensile elastic modulus | 2 GPa | 1 GPa | 2 GPa | 1 GPa | 4 GPa | 0.5 Gpa |
| Viral inactivation efficiency | ○ | ○ | ○ | X | X | ○ |
| Comments | Present invention | Present invention | Present invention | Comparative example | Comparative example | Comparative example |

Immobilization of Antibody

An immune egg delivered by a chicken administered with an antigen was refined to produce influenza virus antibodies (IgY antibodies), which were dissolved in a phosphate buffered saline (PBS) to prepare the antibody concentration at 100 ppm. In the prepared solution were immersed the respective samples of N-1 to N-3 and H-1 to H-3 at room temperature for 16 to 24 hours, to thereby provide the antibodies onto the surface of the fibers.

Evaluation of Viral Inactivation Efficiency

For the test virus solution, a 10-fold dilution of the refined influenza virus with PBS was used. The respective samples N-1 to N-3 and H-1 to H-3 were cut into 5 cm square pieces, and were attached and fixed to the center of a virus spray test apparatus. The test virus solution was placed in a nebulizer that had been set on the upstream side, and a virus collecting apparatus was installed on the downstream side. A compressed air was fed from an air compressor to spray the test virus from the nozzle of the nebulizer. A gelatin filter was set on the downstream side from the mask, and an air in the test apparatus was sucked for 5 minutes at a suction flow rate of 10 L/min to collect the virus mist that had passed therethrough.

After the test, the gelatin filter having the captured virus was collected, and the virus infection value after the test solution had passed through the samples was obtained by a TCID 50 (50% tissue culture infective dose) method using MDCK cells. The viral inactivation efficiency of each sample was calculated by comparing the virus infection values of the gelatin filter with and without the sample. The results having viral inactivation efficiencies of 50% or more was marked ○, and those of 50% or less were marked X, which were summarized in Table 1.

The invention claimed is:

1. A hazardous substance removing material which comprises a support having antibodies supported thereon, wherein the support is made of a fiber, and the moisture regain of a core of the fiber is different from the moisture regain of a sheath of the fiber, wherein the official moisture regain of the fiber constituting the support is less than 7%, and the fiber diameter of the fiber constituting the support is 100 nm or less.

2. The hazardous substance removing material of claim 1 wherein the hygroscopicity of the sheath of the fiber is higher than the hygroscopicity of the core of the fiber.

3. The hazardous substance removing material of claim 1 wherein the weight ratio of the core of the fiber to the sheath of the fiber is 45:55 to 85:15.

4. The hazardous substance removing material of claim 1 wherein the tensile elastic modulus of the fiber constituting the support is 1 GPa or more.

5. The hazardous substance removing material of claim 1 wherein the fiber constituting the support is produced by an electrospinning method.

6. A method for removing hazardous substances which comprises a step of removing hazardous substances in a gas phase or a liquid phase by using the hazardous substance removing material of claim 1.

7. A nonwoven fabric which comprises the hazardous substance removing material of claim 1.

* * * * *